United States Patent
Zamir et al.

(10) Patent No.: US 12,530,474 B2
(45) Date of Patent: Jan. 20, 2026

(54) METHOD FOR PROVING DEVICE IDENTITY TO SECURITY BROKERS

(71) Applicant: Fortinet, Inc., Sunnyvale, CA (US)

(72) Inventors: Tal Zamir, Tel Aviv (IL); Boris Figovsky, Sha'ar Efraim (IL); Oren Zomer, Tel Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 289 days.

(21) Appl. No.: 18/065,261

(22) Filed: Dec. 13, 2022

(65) Prior Publication Data

US 2023/0195914 A1 Jun. 22, 2023

Related U.S. Application Data

(60) Provisional application No. 63/265,545, filed on Dec. 16, 2021.

(51) Int. Cl.
*G06F 21/62* (2013.01)
*H04L 9/32* (2006.01)

(52) U.S. Cl.
CPC ........... *G06F 21/62* (2013.01); *H04L 9/3213* (2013.01)

(58) Field of Classification Search
CPC ...... G06F 21/62; H04L 9/3213; H04L 9/0894
See application file for complete search history.

(56) References Cited

U.S. PATENT DOCUMENTS

| | | | |
|---|---|---|---|
| 5,276,444 A | 1/1994 | McNair | |
| 9,578,063 B1 * | 2/2017 | Iyer | G06F 9/45558 |
| 11,019,034 B2 * | 5/2021 | Ludin | H04L 63/0853 |
| 2017/0041347 A1 * | 2/2017 | Nagaratnam | H04L 63/0227 |
| 2018/0375863 A1 * | 12/2018 | Fan | G06F 21/31 |
| 2019/0190890 A1 * | 6/2019 | Druker | G06F 21/6254 |
| 2019/0228144 A1 * | 7/2019 | Kermes | H04L 63/0861 |
| 2019/0245856 A1 * | 8/2019 | Irwan | H04L 9/0643 |
| 2020/0028841 A1 * | 1/2020 | Mars | G06Q 20/308 |
| 2020/0162432 A1 * | 5/2020 | Ludin | H04L 63/0807 |
| 2020/0280592 A1 * | 9/2020 | Ithal | H04L 63/12 |
| 2021/0084038 A1 * | 3/2021 | Feasel | G06F 21/629 |
| 2021/0120307 A1 * | 4/2021 | Bastable | H04N 21/4408 |
| 2021/0243595 A1 * | 8/2021 | Buck | H04W 12/37 |
| 2021/0407668 A1 * | 12/2021 | Fish | H04L 63/101 |
| 2022/0092078 A1 * | 3/2022 | Chen | G06F 16/27 |
| 2022/0294775 A1 * | 9/2022 | Singh | H04L 63/0884 |
| 2022/0350527 A1 * | 11/2022 | Henson | G06F 3/064 |

* cited by examiner

*Primary Examiner* — Shawnchoy Rahman
*Assistant Examiner* — Blake I Narramore
(74) *Attorney, Agent, or Firm* — Jaffery Watson Hamilton & DeSanctis LLP

(57) ABSTRACT

A method for use in granting access to a target to a user device, comprising: receiving at a proxy a request to access the target; forwarding by the proxy the access request to a security broker when the user device is verified by the proxy to know a prescribed secret, wherein the request is forwarded so as to appear to originate from a prescribed set of internet protocol (IP) addresses that the security broker recognizes as trusted; receiving by the proxy from the security broker (i) an access token, the access token being submittable to the target by the user device to gain access thereto and (ii) instructions for transmission to the user device for causing the user device to be redirected to an address indicating the requested target; and transmitting by the proxy toward the user device the access token and the instructions.

15 Claims, 5 Drawing Sheets

METHOD FOR PROVING DEVICE IDENTITY TO SECURITY BROKERS

CROSS-REFERENCE TO RELATED APPLICATIONS

This application claims benefit of U.S. provisional patent application Ser. No. 63/265,545, filed on Dec. 16, 2021, which is herein incorporated by reference.

TECHNICAL FIELD

The present disclosure relates generally to proving device identity to a security broker, e.g., a cloud security broker, and more specifically with only requiring minimal configuration of the security broker.

BACKGROUND

FIG. 1 shows a prior art arrangement 10 for use by enterprise for granting access to an enterprise application (app). Shown in FIG. 1 are user device 100, security broker 120, e.g., a cloud security broker (CSB), and enterprise target application (app) 140 all communicatively connected by network 130. In this regard, enterprises are adopting security arrangements, e.g., employing a zero-trust security model, in which each access to an enterprise target application is granted only after a cloud security broker such as CSB 120 has verified both the identity of the user and the identity of the user device, e.g., user device 100. Thus, the cloud security broker, or zero trust broker, sits in the cloud between users at their devices on the one hand and enterprise or other cloud apps on the other.

Generally, current cloud security brokers work as follows:

The user device 100 initiates a request to connect to an enterprise target app, often via a browser on user device 100, typically in one of two ways. According to a first way, the user clicks an app in an application portal hosted on the cloud security broker 120 service. According to a second way, the user clicks a "sign on with SSO", where SSO stands for single sign on button in the app the user wants to access and then the user is redirected to the cloud security broker 120 to undergo security checks that must be passed to gain access to that app.

Each of these approaches results in a request 201 in the prior art state diagram of FIG. 2 from the user device 100 to the cloud security broker 120. As such, regardless of which approach is employed, the user device 100 ends up accessing a fully qualified domain name (FQDN) of the cloud security broker 120 as shown in FIG. 2, e.g., login.microsoftonline.com, denoted as X. CSB 120 then performs verification of user's alleged identity and the identity of the user device 100.

The user's identity is conventionally identified using a username and password possibly using a two-factor authentication (2FA).

The cloud security broker can verify the identity of the user device 100, e.g., at 203, in a variety of ways including, for example: a) requiring a client certificate on the user device 100; b) requiring an agent application on the device to attest that the device is healthy, c) requiring the user device 100 to be joined to a domain, e.g., Active Directory, or d) requiring the user device 100 to be connecting from a known location or a known set of IP addresses, such as, for example, IP addresses that belong to the corporate network.

There is a wide variety of cloud security brokers/zero trust vendors in the market including, for example, Microsoft, ZScaler, Okta, Ping, and so forth. However, each vendor has its own methods of verifying device identity and there is no global standard for doing so.

After completing the identity verification process at 203, the cloud security broker 120 provides the user device 100 at 205 with an access token and instructions to cause the user device 100 to be redirected to the requested target app 140, e.g., www.office.com, denoted as Y. The user device 100 accesses the target app 140 by presenting the received token in 207. It also may send requests for content to the target app 140. The target app 140 responds with the requested content in 209.

It is also desirable to prove the health of the user device, e.g., that has up-to-date security software, e.g., anti-virus, firewall, and the like. However, there is no standard way of proving the health of the user device. In addition, current endpoint security products that can attest for the device's health or identity cannot easily integrate with all of the cloud security brokers in a generic way.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for use in granting access to a target to a user device. The method comprises: receiving at a proxy a request to access the target; forwarding by the proxy the access request to a security broker when the user device is verified by the proxy to know a prescribed secret, wherein, when forwarded, the request is forwarded so as to appear to originate from a prescribed set of internet protocol (IP) addresses that the security broker recognizes as trusted; receiving by the proxy from the security broker (i) an access token, the access token being submittable to the target by the user device to gain access thereto and (ii) instructions for transmission to the user device for causing the user device to be redirected to an address indicating the requested target; and transmitting by the proxy toward the user device the access token and the instructions.

Certain embodiments disclosed herein include a system for use in granting access to a target to a user device. The system comprises a processing circuitry; and a memory, the memory containing instructions that, when executed by the processing circuitry, configure the system to: receive at a proxy a request to access the target; forward by the proxy the access request to a security broker when the user device is verified by the proxy to know a prescribed secret, wherein, when forwarded, the request is forwarded so as to appear to originate from a prescribed set of internet protocol (IP) addresses that the security broker recognizes as trusted; receive by the proxy from the security broker (i) an access token, the access token being submittable to the target by the user device to gain access thereto and (ii) instructions for transmission to the user device for causing the user device to be redirected to an address indicating the requested target; and transmit by the proxy toward the user device the access token and the instructions.

Certain embodiments disclosed herein include security broker performing a method comprising: receiving a request to access a target application; when the request is determined to have come from an internet protocol (IP) address of a known proxy, verifying a user identity supplied for the request; when the user identity is verified, transmitting to the proxy (i) an access token, the access token being submittable to the target by user device to gain access thereto and (ii) instructions for transmission to the user device for causing the user device to be redirected to an address indicating the requested target.

DETAILED DESCRIPTION

Figure 1:
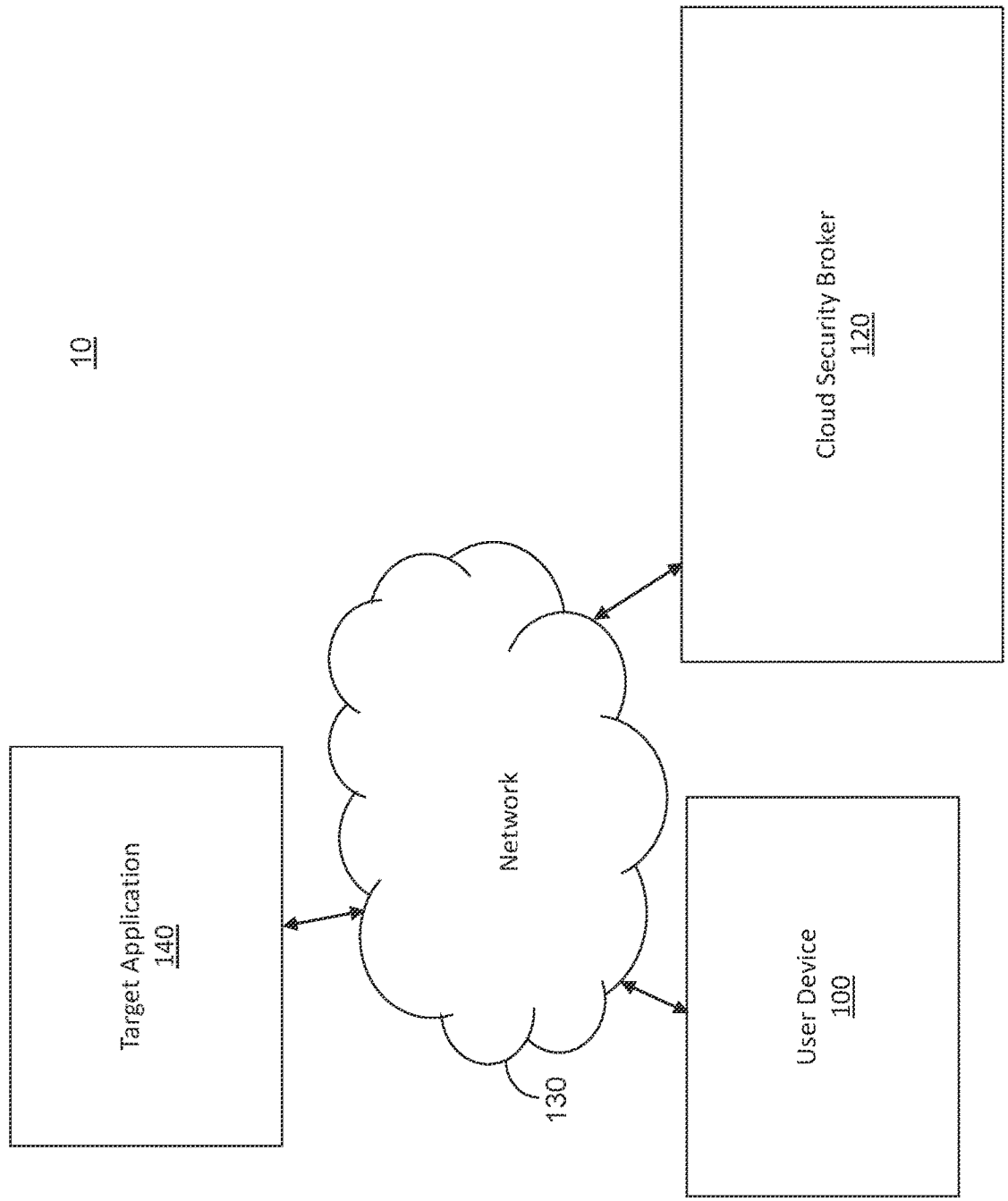
FIG. 1 shows a prior art arrangement for use by enterprise for granting access to an enterprise application (app)
Figure 2:
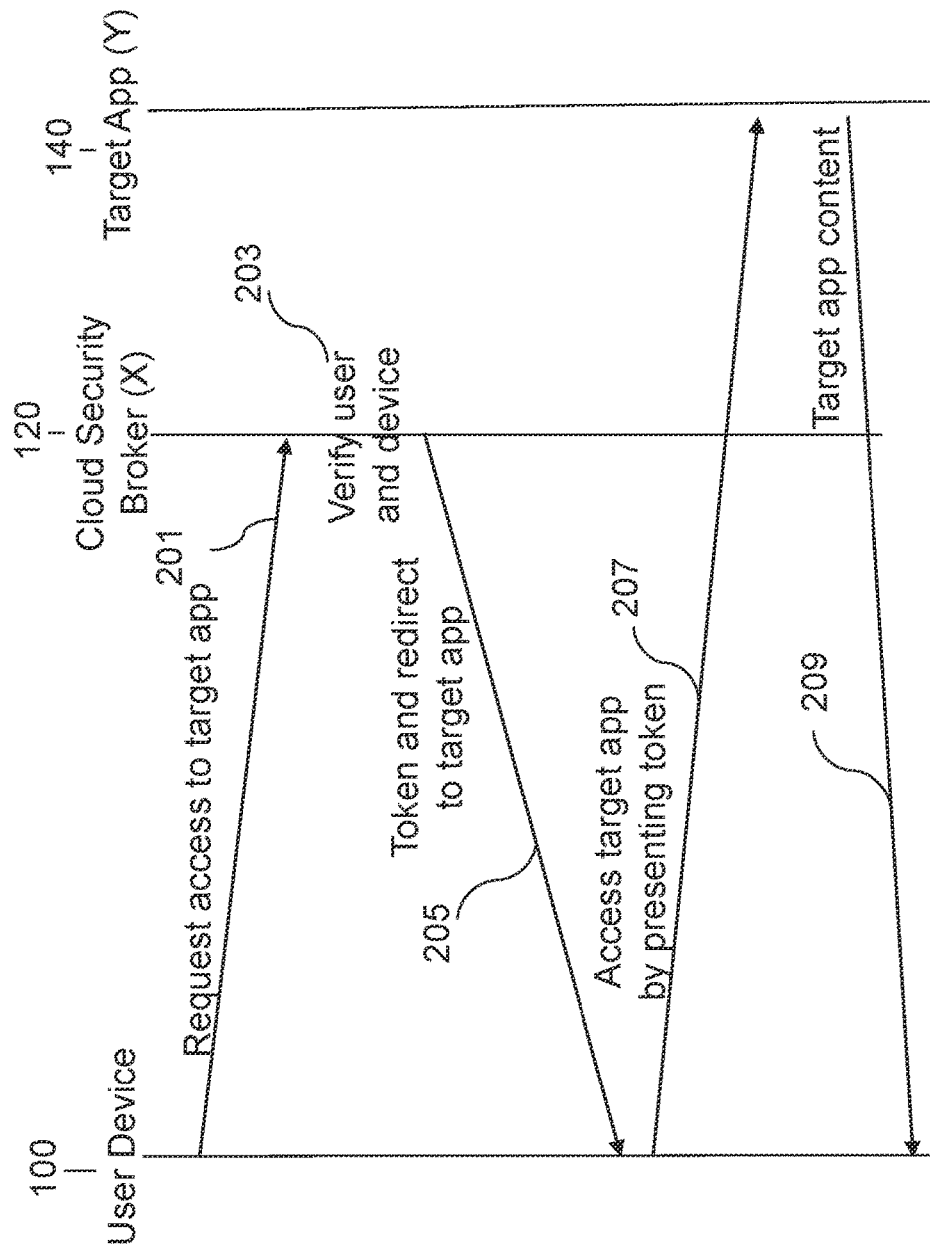
FIG. 2 shows a prior art state diagram for obtaining access by a user device to a target application using a security broker.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

We have recognized that a common mechanism that almost all zero trust or identity and access management vendors support for user device verification is to trust user devices that connect from a known location or IP address. However, endpoint security products cannot force the user device traffic to go through a proxy or virtual private network (VPN) service so as to ensure that the source IP of the traffic is of a fixed set of specific IP address. Forcing most or all of the traffic to go through a proxy or VPN before reaching the final destination would degrade the user's experience as doing so introduces latency as well as loading the proxyNPN with a significant amount of traffic of user devices, making the solution non-scalable.

In accordance with this disclosure, identity may be proven to a security broker by guaranteeing that a user's request for access comes from one of a set of known and trusted IP addresses at which is located a dedicated proxy service that verifies, before forwarding a request to the security broker, that the request is coming from a device which knows a prescribed secret S and only performing user identity verification by the security broker for requests for access that come from the known and trusted IP address of the cloud proxy.

Figure 3:
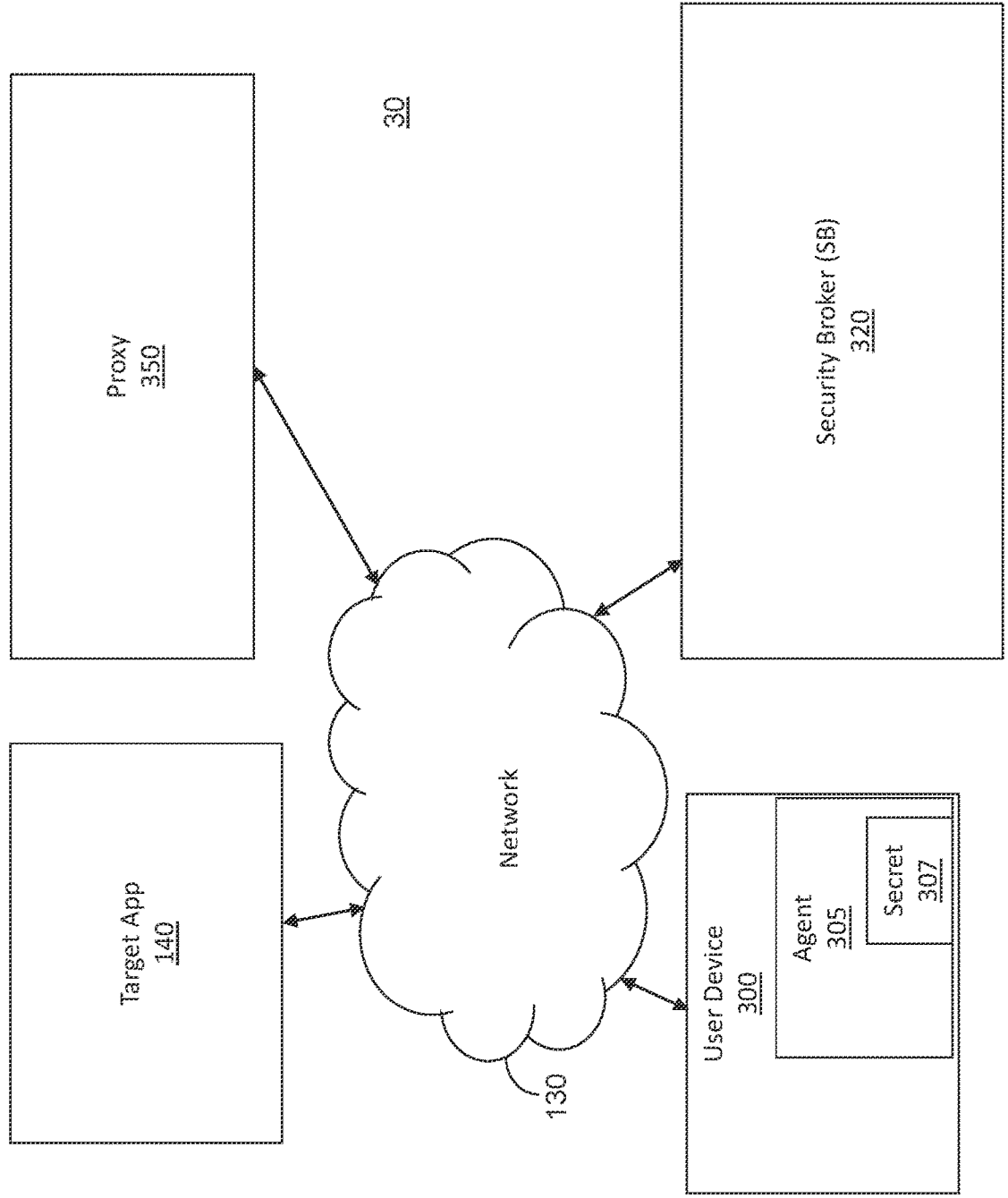
FIG. 3 shows an illustrative arrangement for use by enterprise for granting access to an enterprise application (app) in accordance with the principles of the disclosure.

FIG. 3 shows an illustrative arrangement 30 for use by enterprise for granting access to an enterprise application (app) in accordance with the principles of the disclosure. Shown in FIG. 3 are user device 300, security broker (SB) 320, enterprise target application (app) 140, and proxy 350 all of which are communicatively connected by network 130.

User device 300 is similar to user device 100 but it has software agent 305 installed thereon. Software agent 305 could be implemented in various ways, including being, for example, any application (app) or software installed on the device, a browser extension, or any other software component running on the user device. Software agent 305 may, but need not, be installed on user device 305 and so it can be deployed temporarily or in other ways. Software agent 305 on user device 300 is provisioned with or has access to a secret S 307. Software agent 305 may be installed when user device 300 is setup, e.g., by an enterprise's information technology (IT) department and secret S 307 is provided as part of software agent 305. Alternatively, third-party management software already on user device 300 may install software agent 305. The installation may be a result of the user being authenticated and the administrator approving the user's device after the user is authenticated. Those of ordinary skill in the art understand how to install such agents and secrets.

In one embodiment secret S 307 may be a client certificate and is typically unique to one user device. A client certificate is a digital certificate which is used by a user device to prove its identity to a remote device, such as proxy 350. A client certificate typically contains pertinent information like a digital signature, an expiration date, the name of the client, the name of the certificate authority, revocation status, SSL/TLS version number, a serial number, and possibly more. Secret S may employ private-public key technology.

In another embodiment secret S 307 may be a rotating token provided by another user or device identification/validation service.

Security broker 320 is a security broker similar to those of the prior art, e.g., cloud security broker 120, but it must have the feature, common in many prior art security brokers, that in order for security broker to perform identity verification the request must come from one of a known set of locations or IP addresses, in this case a location or an IP address of proxy 350. If a request for identity verification comes from anywhere else, the verification will fail or the request will simply be rejected and verification will not even be performed. Security broker 320 may be, but need not be, located in the cloud, i.e., it may be, but need not be, a cloud security broker.

Proxy 350 receives the requests and operates to verify the secret S and to redirect the request to security broker 320, thus ensuring that all valid requests come from the known location or an IP address of proxy 350. Proxy 350 is typically a dedicated cloud proxy service.

Target app 140 is an enterprise target application, e.g., the same enterprise target application (app) 140 of FIG. 1. Advantageously, no changes are required to the enterprise target app to implement the disclosure.

Network 130 may be, but is not limited to, a wireless, cellular or wired network, a local area network (LAN), a wide area network (WAN), a metro area network (MAN), the Internet, the worldwide web (WWW), similar networks, and any combination thereof.

Figure 4:
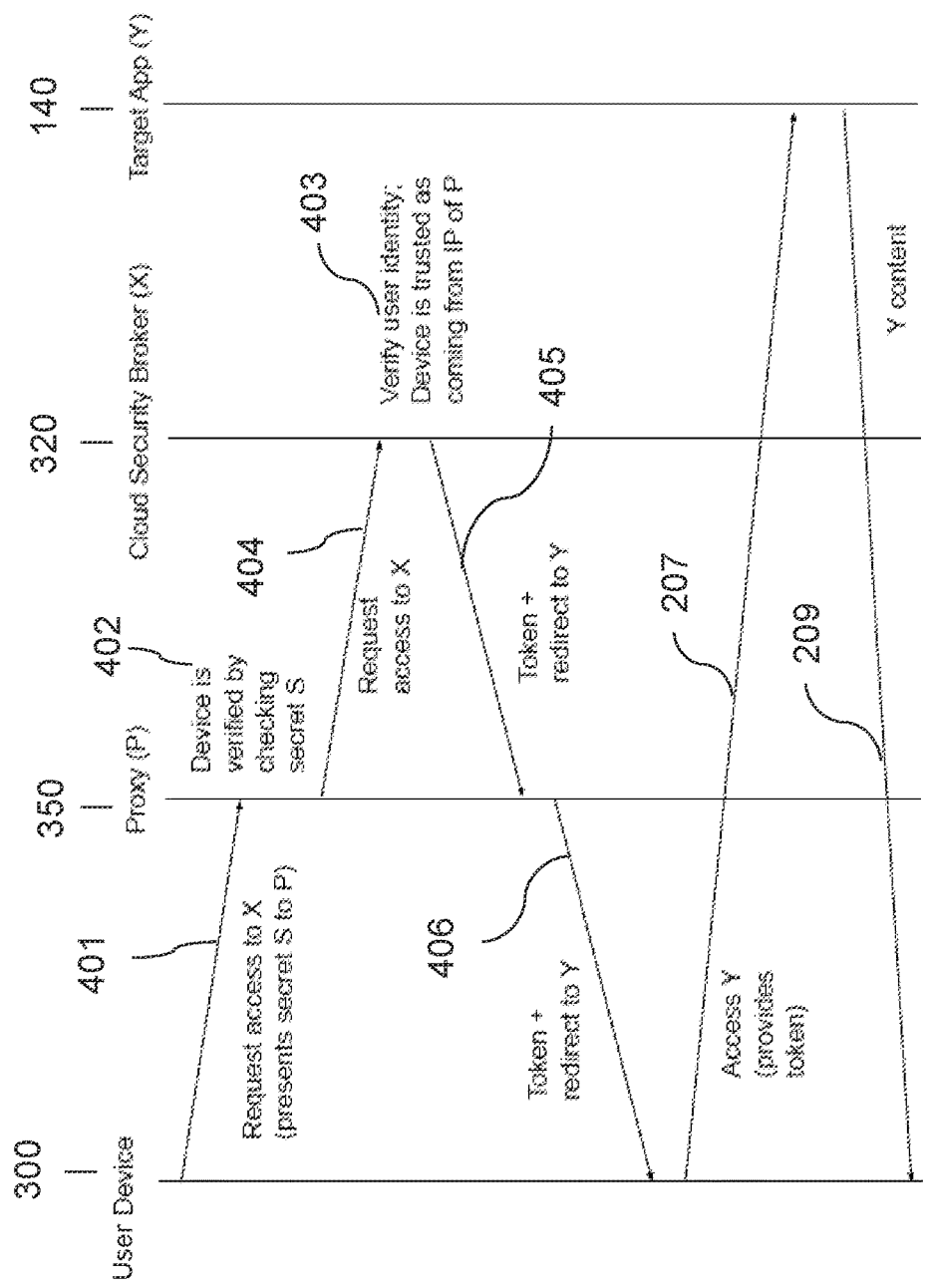
FIG. 4 shows an illustrative state diagram for obtaining access by a user device to a target application using a proxy and a security broker in accordance with the principles of the disclosure.

In operation, as shown in FIG. 4, software agent 305 automatically intercepts web requests coming from the device that try to obtain authentication by accessing security broker 320, e.g., as a result of user device 300 attempting to access target app 140 directly or by user device 300 attempting to access an enterprise app portal, where security broker 320 is specified by a fully qualified domain name (FQDN), e.g., login.microsoftonline.com, denoted in FIG. 4 as X. Interception for such requests may be for all requests from entire device or it may be for one or more designated software components executing on the device. As will be readily recognized by those of ordinary skill in the art, security broker 320 may have more than one FQDN. Software agent 305 then redirects the request along with the secret S to proxy 350 at 401.

Note that, in some embodiments, software agent 305 may intercept web requests that are destined for different destinations and may route such requests to different proxies. For example, software agent 305 may intercept web requests that are destined to be processed by a Microsoft cloud, and hence may route such requests to a Microsoft proxy which will use a security broker associated with Microsoft, by providing a FDQN of a Microsoft security broker and software agent 305 may similarly intercept web requests that are destined to be processed by a Google cloud, and hence may route such requests to a Google proxy which will use a security broker associated with Google, by providing a FDQN of a Google security broker.

Proxy 350 determines at 402 whether or not that the request is coming from a user device which has the secret S. If proxy 350 determines that the request is indeed coming from a user device which has the secret S, the request is forwarded at 404 by proxy 350 to security broker 320. If the user device does not have a secret key S, the request is not forwarded from proxy 350 to security broker 320. As a result, advantageously, security broker 320 sees all of the requests from user devices with a respective secret S as coming from one of the known locations, or IP addresses, of proxy device 350, which is denoted in FIG. 4 as P, regardless of what the location or IP address is of the user device that originally initiated the request. Further advantageously, security broker 320 need not be aware of secret S nor does security broker 320 have to manage any secrets. Rather, security broker 320 only needs to know the location or the IP address or addresses of proxy 350.

Security broker 320 is configured to trust all devices that provide a request that originates from P, i.e., user devices for which device identity verification was successful. Optionally, for such user devices security broker 320 may engage at 403 in user identity verification in the conventional manner. As indicated above, the user's identity is conventionally identified using a username and password possibly using a two-factor authentication (2FA).

After completing the identity verification process at 403, assuming the user's identity is verified so that the user should be granted access to target app 140, security broker 320 provides to proxy 350, at 405, an access token and instructions for causing the user device 300 to be redirected to an address indicating the requested target app 140. The address, denoted in FIG. 4 as Y, may be expressed in any conventional manner, e.g., the FQDN of the requested target app 140 or a URL, e.g., www.office.com. This token and instructions are relayed to user device 300 by proxy 350 at 406.

After receipt of the token and instructions, user device 300 accesses the target app 140 by presenting the received token in 207 which is, advantageously, in the conventional manner. It also may send requests for content to the target app 140, i.e., directly without having to send such requests through proxy 350 or security broker 320. The target app 140 responds with the requested content in 209, again in the conventional manner, i.e., directly to target app 140. User device 300 may then continue to access of target app 140, e.g., at FQDN Y, and such subsequent access, e.g., requests thereof, are not intercepted by agent 305 of user device 300. In other words, for as long as reauthentication of user device 300 is not required, all communication between user device 300 and target app 140 continue normally without interception, e.g., directly without requiring any tunnelling or proxying.

The above disclosure provides several advantages beyond those noted above. First, the disclosed arrangement works with almost any existing security broker, as they typically support location or IP address-based device identification. Second, the disclosed approach requires minimal integration with the security broker in that there is no need to set up a complex certificate infrastructure or to make dramatic changes in the security broker. Indeed, the only configuration change required is to establish that access is to be allowed to certain apps only from devices that are coming from a known set of locations or IP addresses. Third, the approach only requires the identification and/or authentication traffic of the user device to be routed to proxy device 350 while such is not required for the entirety of the traffic of the app session itself. This dramatically reduces cost and/or load on proxy device 350 and also ensures that the user experience is not degraded when working with the target app.

In addition, the health of user device 300 may be linked to the validity of secret S. A user device will only be issued a secret S if the provisioner determines that the health of the user device is satisfactory. As such, proxy 350 will only verify user devices that are healthy, as only they will have a valid secret S. In this regard, trying to connect to the target app and complete authentication from any user device that does not have the agent and a proper, valid secret S will not be possible.

Figure 5:
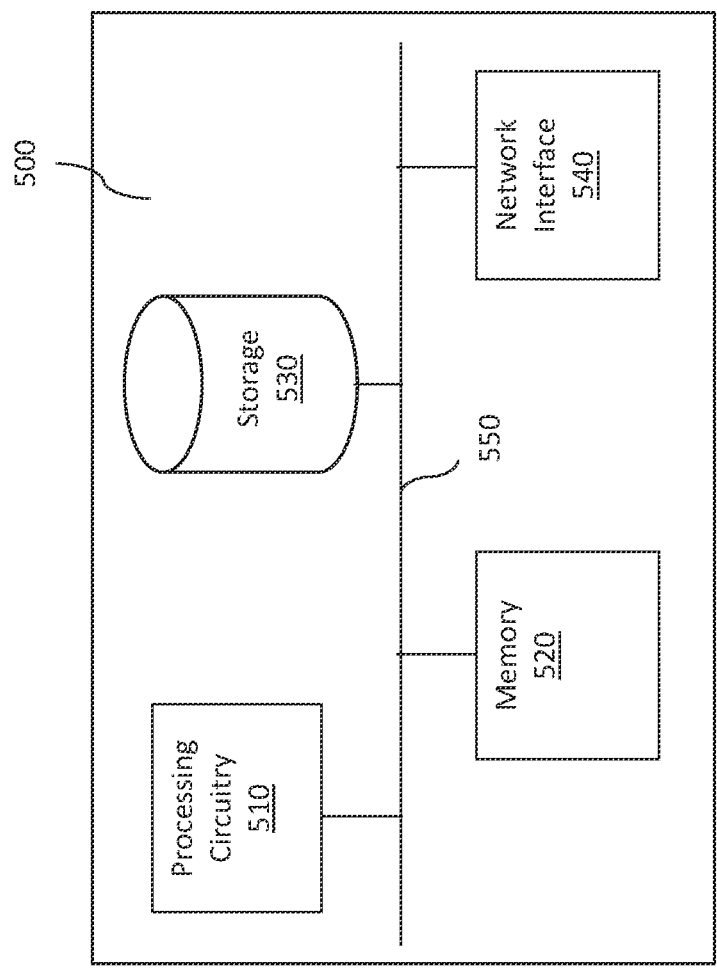
FIG. 5 shows a schematic diagram of an illustrative arrangement for implementing the proxy of FIG. 3 according to an embodiment.

FIG. 5 is a schematic diagram of an illustrative arrangement 500 for implementing proxy 350 according to an embodiment. Arrangement 500 includes processing circuitry 510 coupled to memory 520, storage 530, and network interface 540. In an embodiment, the components of arrangement 500 may be communicatively connected via bus 550.

Processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Memory 520 may be volatile, e.g., RAM, etc., non-volatile, e.g., ROM, flash memory, etc., or a combination thereof. In one configuration, computer readable instructions to implement one or more embodiments disclosed herein may be stored in storage 530.

Memory 520 may be configured to store software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by processing circuitry 510, cause processing circuitry 510 to perform the various processes described herein. Specifically, the instructions, when executed, cause processing circuitry 510 to create, generate, and manage direct to cloud file transfers as described hereinbelow using cloud file descriptors.

Storage 530 may be magnetic storage, optical storage, and the like, and may be realized, for example, as flash memory or other memory technology, CD-ROM, Digital Versatile Disks (DVDs), or any other medium which can be used to store the desired information.

Network interface 540 allows proxy 350, when implemented by arrangement 500, to communicate with other devices over a network, e.g., network 130, for the purpose of, for example, receiving data, sending data, and the like.

It should be understood that the embodiments described herein are not limited to the specific architecture illustrated in FIG. 5, and other architectures may be equally used without departing from the scope of the disclosed embodiments.

The same basic structure as shown in FIG. 5 may be used as well to implement client device 300, security broker 320, and the system on which target app 140 is executing.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for use in granting access to a target to a user device, the method comprising:
   receiving at a proxy an access request to access the target, wherein the user device comprises a software agent, and wherein the software agent intercepts a user request originated by the user device attempting to obtain authentication by a security broker to access the target and forwards the user request and a prescribed secret toward the proxy as the access request;
   forwarding by the proxy the access request to the security broker when the user device is verified by the proxy to know the prescribed secret, wherein, when forwarded, the access request is forwarded so as to appear to originate from a prescribed set of internet protocol (IP) addresses that the security broker recognizes as trusted;
   receiving by the proxy from the security broker (i) an access token, the access token being submittable to the target by the user device to gain access thereto and (ii) instructions for transmission to the user device for causing the user device to be redirected to an address indicating the requested target; and
   transmitting by the proxy toward the user device the access token and the instructions.

2. The method of claim 1, further comprising:
   receiving, by user device, the access token and the instructions; and
   transmitting, by the user device, the access token to the target in response to the instructions.

3. The method of claim 2, further comprising:
   receiving access to the target by the user device in response to the access token, wherein the user device communicates directly with the target after receiving access.

4. The method of claim 2, further comprising:
   granting access by the target to the user device in response to the target receiving the access token, wherein the user device communicates directly with the target after the granting of access by the target.

5. The method of claim 1, wherein the location of the security broker is specified by a fully qualified domain name.

6. The method of claim 1, wherein the proxy receives the prescribed secret from the user device.

7. The method of claim 1, wherein the prescribed secret is one of the group consisting of a client certificate and a rotating token.

8. The method of claim 1, wherein the user device obtains the prescribed secret only when a provisioner of the prescribed secret determines the user device has satisfactory health in that the user device meets at least one criterion specified by at least one of the group consisting of the provisioner and a provider of the target application.

9. The method of claim 1, wherein the target is one of the group consisting of a target application and an enterprise application portal.

10. A system for use in granting access to a target to a user device, the system comprising:
   a processing circuitry; and
   a memory, the memory containing instructions that, when executed by the processing circuitry, configure the system to:
   receive at a proxy an access request to access the target, wherein the user device comprises a software agent, and wherein the software agent intercepts a user request originated by the user device attempting to obtain authentication by a security broker to access the target and forwards the user request and a prescribed secret toward the proxy as the access request;

forward by the proxy the access request to the security broker when the user device is verified by the proxy to know the prescribed secret, wherein, when forwarded, the access request is forwarded so as to appear to originate from a prescribed set of internet protocol (IP) addresses that the security broker recognizes as trusted;

receive by the proxy from the security broker (i) an access token, the access token being submittable to the target by the user device to gain access thereto and (ii) instructions for transmission to the user device for causing the user device to be redirected to an address indicating the requested target; and transmit by the proxy toward the user device the access token and the instructions.

11. The system of claim 10, wherein the user device is configured to:
receive the access token and the instructions;
transmit the access token to the target in response to the instructions;
receive access to the target in response to the access token; and
communicate directly with the target after receiving access.

12. The system of claim 11, wherein the system is further configured to:
grant access by the target to the user device in response to the target receiving the access token, wherein the user device communicates directly with the target after the granting of access.

13. The system of claim 10, wherein the location of the security broker is specified by a fully qualified domain name.

14. The system of claim 10, wherein the user device obtains the prescribed secret only when a provisioner of the prescribed secret determines the user device has satisfactory health in that the user device meets at least one criterion specified by at least one of the group consisting of the provisioner and a provider of the target application.

15. The system of claim 10, wherein the target is one of the group consisting of a target application and an enterprise application portal.

* * * * *